United States Patent [19]

Waters et al.

[11] 3,863,668
[45] Feb. 4, 1975

[54] LINED FLUID FIXTURE

[75] Inventors: Frank J. Waters, Northridge; Lawrence R. Good, Redondo Beach, both of Calif.

[73] Assignee: Fansteel Inc.

[22] Filed: Oct. 3, 1973

[21] Appl. No.: 403,321

Related U.S. Application Data

[63] Continuation of Ser. No. 198,153, Nov. 12, 1971, abandoned.

[52] U.S. Cl..................... 137/375, 285/55, 285/156
[51] Int. Cl............................................. F16k 31/52
[58] Field of Search ............. 137/375; 285/156, 55; 251/368

[56] References Cited
UNITED STATES PATENTS

| | | | |
|---|---|---|---|
| 925,809 | 6/1909 | Henss................................ | 137/375 |
| 1,947,257 | 2/1934 | Fritz et al. ......................... | 137/375 |
| 2,454,160 | 11/1948 | Greene .............................. | 137/375 |
| 2,511,343 | 6/1950 | Kaiser.............................. | 285/156 X |
| 2,792,845 | 5/1957 | Atherton et al. .................. | 137/375 |

Primary Examiner—Henry T. Klinksiek
Attorney, Agent, or Firm—Max Dressler

[57] ABSTRACT

A fluid fixture such as a valve having a split body defining therein a passage, the body being formed by two interconnected separable body sections which may be separated to provide access to said passage. An integral, preformed, rigid, thin-walled generally tubular liner inserted into the accessible passage is enclosed therein by the two body sections when interconnected. The configurations of the passage and the liner preclude insertion of the liner into the passage without separation of the body sections, the liner being securely held within the body against relative movement with respect to the body as a result of the geometry of the liner.

18 Claims, 5 Drawing Figures

PATENTED FEB 4 1975 3,863,668

LINED FLUID FIXTURE

This is a continuation of application Ser. No. 198,153, filed Nov. 12, 1971 now abandoned.

BACKGROUND OF THE INVENTION

The need for corrosion resistant fluid handling fixtures such as valves for use in various environments is well-known. While there are in existence materials which are highly corrosion resistant, such as tantalum, columbium, and alloys thereof, and while fluid handling fixtures such as valves have been made completely from such material, the cost of such fixtures is so prohibitedly expensive that the search for viable alternatives persists.

The basic alternative to hydraulic fixtures, such as valves, made of solid tantalum or similar materials has been to construct the valve body or shell of a material which is capable of providing desired structural characteristics and of lining the interior of the body with a corrosion resistant material. For fixtures which have a relatively simple shape such as spools and pipe sections, the provision of suitable liners presents no significant problem. Thus, for example, it is of no difficulty to insert a thin wall tube of refractory material interiorally of a spool or pipe section in order to provide the desired corrosion resistance.

When it comes to providing a lining within fixtures having complex internal configurations for example, angle valves, T-valves, T-sections and the like, the ability to provide at reasonable cost linings that perform satisfactorily has been a vexing problem.

One approach has been to utilize a flexible or malleable material which can be formed internally of the fixture into a shape which conforms to the internal configuration thereof. The difficulty with this approach is that materials which are capable of being deformed within the valve do not have the necessary corrosion resistance. Alternatively, a plurality of discrete sections of liners have been inserted into the fixture. These distinct sections are either inserted into an overlapping configuration or attempts have been made to bond these sections together in place within the fluid fixture.

While these approaches might be satisfactory for certain operating conditions and for some very large fixtures, they still do not satisfactorily resolve the problem.

It should be understood, that the corrosive reagents typically found in chemical plants include nitric acid, hydrochloric acid, sulfuric acid, ferric cloride, just to name a few. The conditions under which these reagents are processed, namely high pressure and high temperature can cause leaks in various components of the fluid system such as the pumps, the valves, the pipes and fittings. The resultant downtime seriously and adversely affects the operational efficiencies of such installations.

At the pressures and temperatures at which many of such installations operate, the existing approaches to lining valves have not been satisfactory. For example, when a plurality of discreet lining sections are utilized, the reagents have a tendency to get past the joints between the discrete lining sections. If the alternative approach is utilized, i.e., bonding of the sections together within the valve, the potential of contamination of the corrosive resistant material is sufficiently great that the bonded connections become the "weak link in the chain" and although the lining material itself operates satisfactorily the overall lined valve is subject to failure.

It is evident that a lined valve capable of maintaining its corrosion resistance integrity, which at the same time is not prohibitedly expensive, and which concurrently may be readily repaired in the event of failure, either mechanical or human induced, would be highly desirable.

SUMMARY OF INVENTION

In accordance with the present invention there is provided a corrosion resistant fluid fixture incorporating an integral, preformed, continuous lining in the interior thereof formed from the material selected to maximize the corrosion resistance of the fixture.

While the present invention is equally applicable to any fixture for use with corrosive fluids in which the internal configuration of the fixture is such as not to be readily lined by simple insertion of a tubular type liner, it will, for convenience and simplicity, be described with respect to an angle valve.

The type of valve structure with which the present invention is most concerned is that in which the internal configuration of the valve body is such that any liner placed therein would be locked against relative movement with respect to the body because of the geometry thereof. Thus, the internal configuration of the valve body and the liner incorporated therein define interlocking shapes which would be expected to preclude the incorporation of an integral preformed liner within the valve body.

In accordance with the present invention, the apparent inaccessibility of the valve body interior is overcome by providing a split valve body which in the illustrated embodiment is split diametrically across the discharge port of the valve wherein the valve seat is located.

In accordance with the present invention, the fluid flow path is defined by an integral, preformed, rigid, thin-walled, free-standing liner produced from suitable corrosion resistant material such as tantalum, columbium or alloys thereof. Tantalum and tantalum alloys, for example, are highly corrosion resistive to 93 common industrial chemicals as well as nine liquid metals. One material that is particularly corrosion resistant is a tantalum-tungsten alloy disclosed and claimed in Schussler, U.S. Pat. No. 3,592,639, which issued July 13, 1971 and is sold by Fansteel Inc. under its trademark "63 METAL."

The utilization of an integral, preformed, rigid, thin-walled, free-standing corrosion resistant liner finds particular use in valves and fluid fixtures in which the shape of the liner would be incapable of being inserted into the body of the valve or fixture.

The advantage of utilizing such a preformed liner is that it is an integrally formed body produced to close tolerances and under conditions which insure the integrity of the liner throughout its extent. In order to take advantage of this type of configuration, and because of the integrity of the liner, it is possible to split the valve body in half to permit access to the interior thereof.

The interior of the valve body may also be produced to close tolerances and the valve liner may be readily inserted after which the body halves are affixed together to provide the desired structure. The splitting of the valve body does not adversely affect the performance of the valve because of the use of the integral preformed liner. Since the liner itself defines the fluid path and since the liner itself is an integral structure, the valve body is required only for providing structural support for the liner.

The use of the preformed integral liner incorporated in a split valve body allows for the selection of any desired configuration in a valve or other fluid handling fixture to provide acid and corrosion resistance over wide ranges of temperature and pressure, and for variety of chemical compositions.

In addition, the utilization of a preformed liner allows for selection of desired liner materials as a function of the intended use of the structure.

Not only does the use of the integrally formed liner within the split valve body provide for a reliable structure, but simultaneously reduces the cost of such valves, especially larger structures. This is a result, for example, of the replacement of the previously required solid valves. Furthermore, a minimum of downtime is required to replace a liner in the event of mechanical failure and repair of the liner off stream after replacement with a new liner. In addition, the valve body, which can be made any suitable structural material such as steel, can also be replaced if it corrodes, while the liner, which is made from a substantially more expensive material, is useable in a new body.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

DESCRIPTION OF ONE EMBODIMENT

Figure 1:
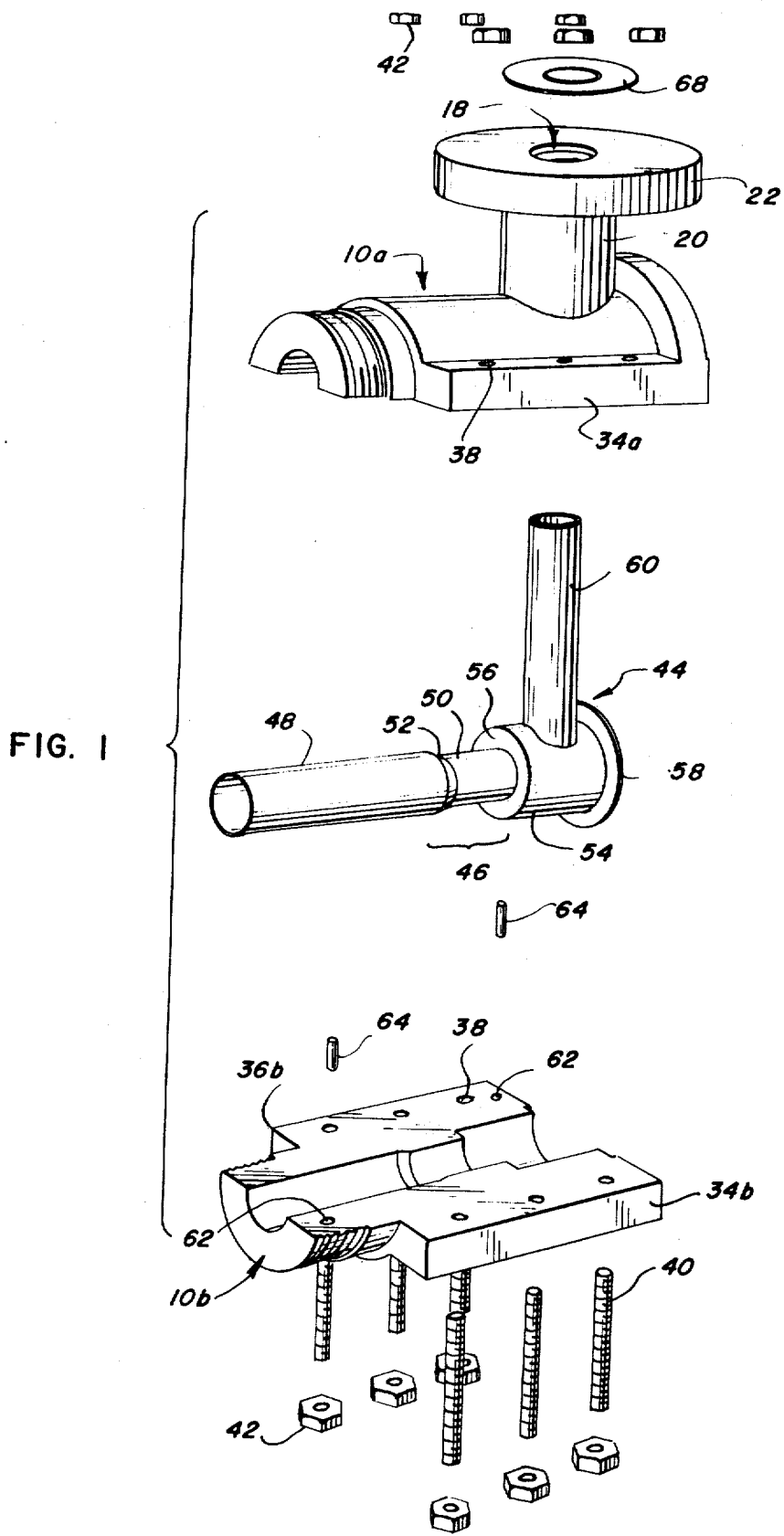
FIG. 1 is an exploded perspective view showing the components of a valve embodying the present invention.
Figure 2:
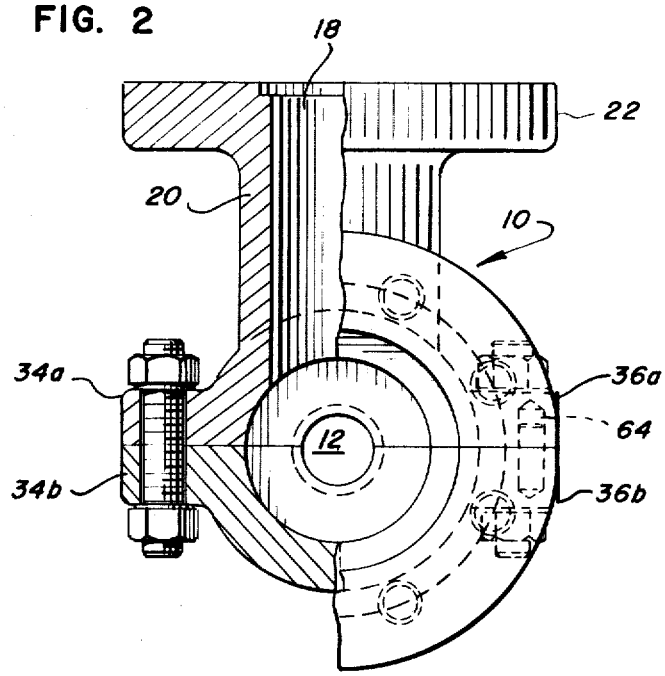
FIG. 2 is an end view thereof, partially in section.
Figure 3:
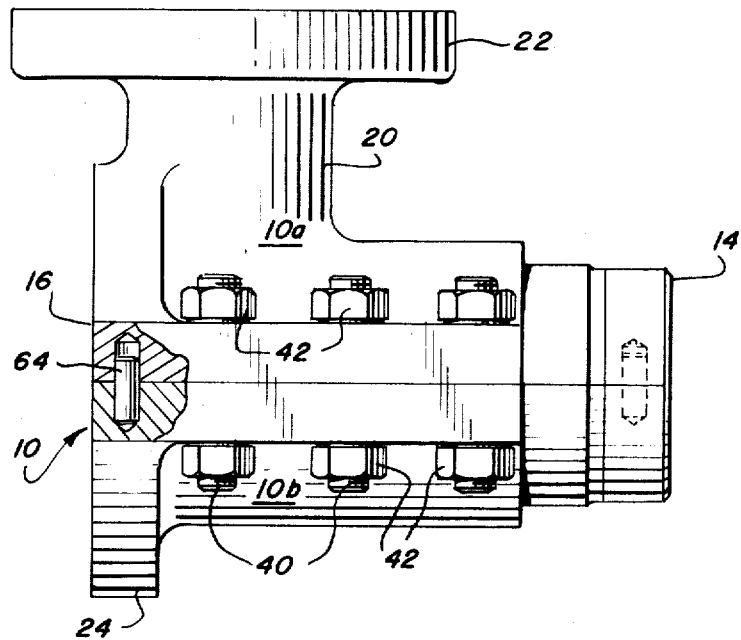
FIG. 3 is a side view thereof, partially broken away.
Figure 4:
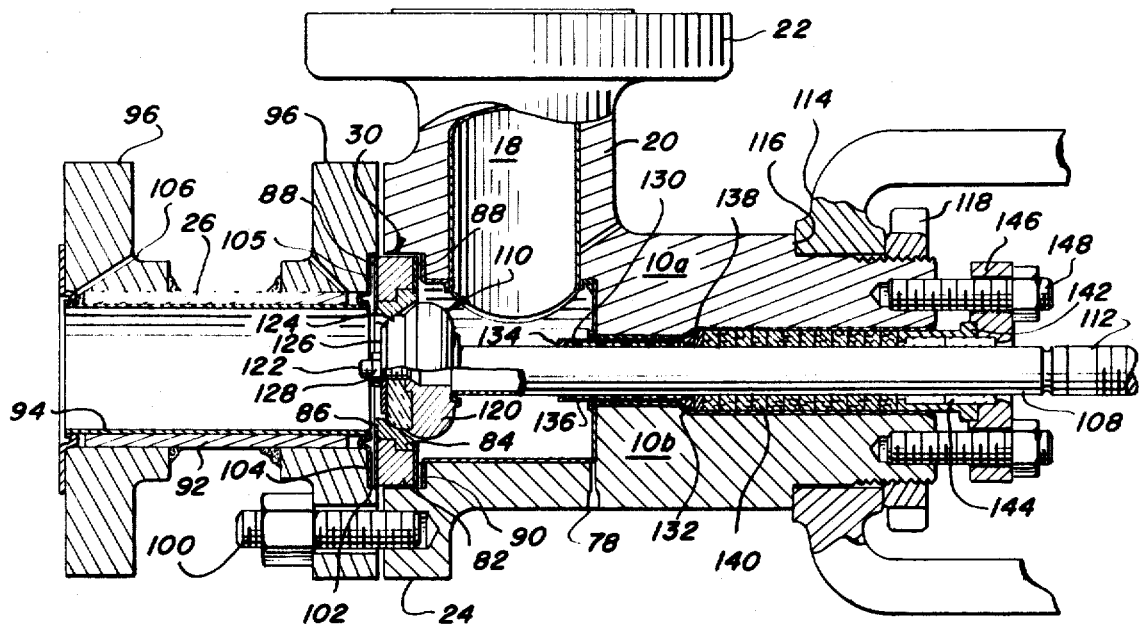
FIG. 4 is a sectional view similar to FIG. 3 showing the internal valve components.
Figure 5:
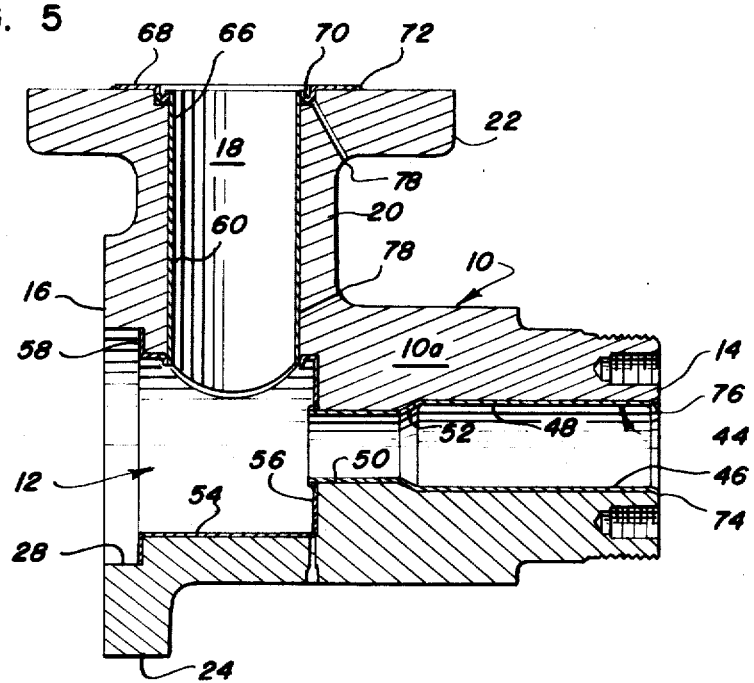
FIG. 5 is a sectional view in elevation of the valve body showing the liner in place.

While this invention is susceptible of embodiment in many different forms, there is shown in the drawings and will herein be described in detail one specific embodiment, with the understanding that the present disclosure is to be considered as an exemplication of the principles of the invention and is not intended to limit the invention to the embodiment illustrated.

The valve structure shown in the drawing is an angle valve in which the fluid flow path traverses an angle of 90° from the inlet to the outlet. The valve body 10 when assembled is generally T-shaped and defines a generally axial bore 12 extending from the valve stem end 14 to the outlet end 16. An inlet passage 18 extends at an angle of 90° to the axial bore 12 into a riser 20 which terminates in the usual exterior flange, inlet flange 22. The outlet end 16 of the valve body 10 also terminates in the usual exterior flange, outlet flange 24 to which a suitable pipe section or spool 26 may be connected. A recess 28 formed in the outlet of the valve body 10 is adapted to receive a valve seat ring assembly 30.

The valve body 10 is split along a plane which passes diametrically through the axial bore 12 into two sections, an upper half 10a and a lower half 10b. With the exception of the inlet riser 20, which extends up from the upper half 10a of the valve body 10, the body halves 10a, 10b are substantially identical.

Each valve body half 10a, 10b includes a pair of radially extending, opposed body half connecting flanges 34a, 34b, 36a, 36b, having a sufficient axial dimension to allow for a plurality of bolt holes 38 adapted to to receive suitable body connecting studs 40 and nuts 42 for connecting the body halves together. The internal surfaces of the valve body halves 10a, 10b, including the axial bore 12 and the inlet passage 18 generally are machined or otherwise manufatured to a very close tolerances in order to accommodate an integral, preformed, rigid, free-standing thin-walled corrosion resistant liner 44.

In the embodiment shown in the drawing, the liner 44 includes an axial segment 46 corresponding to the axial bore 12. The axial segment 46, includes a first tubular or packing section 48, and a second tubular or sleeve section 50 of smaller diameter than the packing section 48, the tubular sections 48, 50 being interconnected by a tapered section 52. The other end of the sleeve section 50 opens into one end of a generally cylindrical fluid chamber 54, also forming a part of the liner axial segment 46, and is connected thereto by a transverse annular wall 56. The discharge end of the fluid chamber 54 terminates in a generally annular external seat flange 58.

An inlet riser or segment 60 disclosed at an angle of 90° to the axial segment 46 intersects the top of the fluid chamber 54.

In assembly, the inlet riser 60 of the preformed liner is inserted into the inlet passage 18 in the riser 20 formed as a part of valve body upper half 10a, with the axial segment 46 of the liner 44 in engagement with the portion of axial bore 12 formed in the valve body upper half 10a. The valve body lower half 10b is then brought up into engagement with the upper half 10a to to completely enclose the valve liner 44.

If desired, the body halves may be provided with pin holes 62 and a pair of dowel pins 64 may be utilized to insure correct alignment of the two body halves 10a, 10b.

The liner 44 is affixed to the closed valve body 10 at only two locations. The open end 66 of the liner riser 60 is welded to an inlet facing plate 68 of the same corrosive resistant material as the liner 44, the inlet facing plate 68 including an appropriate expansion joint 70. The peripheral edge 72 of the facing plate 68 is welded to exposed surface of the inlet flange 22. The valve stem end 74 of the axial portion 46 of the liner 44 opposite is physically flared at 76 to further lock the liner 44 in position within the closed valve body 10.

The valve body 10 is provided with a plurality of weep holes 78 utilized to detect any leaks that might occur internally of the valve.

The valve seat ring assembly 30 is disposed within the seat recess 28 formed in the outlet 16 of the valve body 10. The seat ring assembly 30 includes a generally annular seat ring 82, the internal surface 84 of which is of a stepped configuration to accommodate the valve seat insert 86. The annular seat ring 82 may be made of any suitable material and the seat insert 86 which is stepped to conform with the stepped configuration of the seat ring is made of a corrosion resistant material, typically the same as the liner 44. The seat insert 86 is held in place within the seat ring 82 by a pair of corrosion resistant facing plates 88 also made of the same corrosion resistant material, the internal edges of which are each welded to the surfaces of the seat insert 86.

The seat ring assembly 30 is placed within the seat recess 28, with one corrosion resistant facing plate 88 against the liner seat flange 58. A suitable corrosion resistant gasket 90 may be disposed between the seat ring assembly 30 and the liner outlet flange 58. One suitable material for the gasket is a material sold under the trade name Rulon L. D.

The seat ring assembly 30 is retained in place by the spool 26 affixed to the discharge outlet flange 24 of the valve body 10. The spool body 92 may be formed from any suitable structurally sound material such as steel and is also provided with a corrosion resistant liner 94 extending the length thereof. The spool body 92 terminates at either end in a pair of external flanges 96, one flange 96 being adapted for connection to the valve body outlet flange 24, by suitable bolts or studs 100 and the other flange 96 being adapted for connection to suitable piping or other structure (not shown). The valve end of the spool body 92 is recessed at 102 to accommodate a portion of the seat ring assembly 30 and a suitable flexible gasket material 104 interposed between the spool liner facing plate 105 and the facing plate 88 on the seat ring assembly 30. The spool may be provided with suitable weep holes 106 for the detection of any leaks that may occur.

A valve stem 108, plug assembly 110, and valve stem extension 112 is supported on a suitable joke-actuator assembly 114. The yoke-actuator assembly 114 fits over the end 14 of the valve body 10 to engage a shoulder 116 formed therein. The yoke-actuator assembly 114 is retained in position by a yoke lock nut 118 threaded onto the valve body 10. The valve stem 108 may be made from any suitable corrosion resistant material and is connected to the valve stem extension 112 externally of the valve body 10. The valve stem extension 112 is connected to the actuator (not shown) such as a hand wheel in any well-known fashion.

The corrosion resistant valve stem 108 extends through the axial segment 46 of the liner 44 and terminates in the plug stem assembly 110. The valve stem 108 is welded to a suitable plug 120 of desired configuration having an axial stud 122 extending from the exposed face thereof. A soft seat 124 is inserted over the stud 122 and retained in place by a corrosion resistant washer 126 and nut 128.

At the stem end of the axial bore 12, a corrosion resistant guide assembly consisting of a generally tubular tantalum sleeve 130 terminating at one end a tapered cap 132 conforming to the tapered section 52 of the liner 44 and at its other end a cap ring 134 extending internally of the diameter of the sleeve 130 to retain therein a soft corrosion resistant sleeve 136 such as a Rulon sleeve. A gasket 138 abuts the end of the cap ring 134 behind which is located suitable packing 140. The packing 140 is retained in position by a suitable gland 142 in which is disposed another soft corrosion resistant sleeve 144. The gland 142 is adjustedly retained in place by a gland flange 146 affixed to the valve body 10 by suitable studs or bolts 148.

Thus there as been disclosed a fluid handling fixture having therein an integral, preformed, rigid, free-standing, thin-walled, corrosion resistant liner disposed within a split valve body, in which the liner has a configuration which precludes insertion thereof into the closed valve body, which has a wall thickness thinner than the wall thickness of the valve body by at least one order of magnitude, and which when in place within the valve body is locked against relative movement with respect to the valve body, because of the geometry thereof.

The liner of the type disclosed may be readily replaced in the event that either the liner or the valve body itself fails and liners of any selected material of desired corrosion resistance may be utilized.

Fluid fixtures of the present invention have a high degree of reliability. In one test, a 2 inch lined globe valve of the type shown in the drawing performed as well as if it were a solid valve. The test valve was heated with high pressure steam passed therethrough to a temperature of approximately 350°F, cooled to ambient temperature and leak tested at 300 psig in nitrogen. The test was concluded at the end of 2,000 such cycles without any leak having occurred.

In another test, a HCl and $Cl_2$ vapor was passed through the valve at a pressure of about 300 psig and a temperature of about 350°F and operated by stroking from completely open to completely shut-off. After each 100 stroking cycles the valve was closed and double-checked for leaks while under full pressure. After 1,000 cycles a packing leak developed which was corrected by external adjustment of the packing gland. No additional leaks occurred during another 2,000 cycles.

From the foregoing, it will be observed that numerous variations and modifications may be effected without departing from the true spirit and scope of the novel concept of the invention. It is, of course, intended to cover by the appended claims all such modifications as fall within the scope of the claims.

We claim:

1. A corrosion resistant valve structure capable of withstanding internal pressures of 300 p.s.i.g. comprising:
   a split valve body, said valve body defining therein a passage;
   said body being formed by at least two interconnected separable body sections, said body sections being separable to provide access to said passage;
   a one piece, integral, preformed, rigid, thin-walled generally tubular, corrosion resistant liner disposed within said passage, the configuration of the outer surface of said liner being substantially identical to the configuration of said passage, said outer surface of said liner being in intimate contact with the passage defining surfaces of said valve body to inhibit relative movement therebetween, whereby said liner is securely held against relative movement with respect to said valve body.

2. A fluid fixture capable of withstanding internal pressures of 300 p.s.i.g. comprising:
   a body, said body including separable body sections, said body sections each being formed of a rigid material, and each body section having formed therein a portion of a passage with sections of different size, means releasably interconnecting said body sections to one another with said passage portions confronting one another to collectively define a continuous passage in said body;
   a one piece, integral, preformed, rigid, free-standing, thin-walled liner disposed within said passage and having an outer surface conforming to the configuration of said passage, said liner being formed of a corrosion resistant material and being supported within said body with the outer surface of said liner in substantially continuous contact with the surface of said passage to inhibit relative movement therebetween;

said liner having a substantially uniform wall thickness thinner than the thickness of said body sections by at least one order of magnitude, the wall thickness of said liner being insufficient to withstand internal pressures of 300 p.s.i.g., when said liner is not so supported within said body;

whereby the configuration of said passage and said liner preclude the insertion of said liner into said passage and the removal of said liner from said passage and preclude relative movement between said liner and said body when said body sections are interconnected; and said body sections being separable along at least a sufficient portion of said passage by disconnecting said releasable interconnecting means to permit said insertion and removal of said liner.

3. A corrosion resistant valve structure as claimed in claim 2, wherein said liner defines a first generally tubular segment, and a second generally tubular segment intersecting said first tubular segment, the axes of said first and said second tubular segments being disposed at an angle of less than 180° relative to each other.

4. A corrosion resistant valve structure as claimed in claim 3 wherein said first liner segment and a section of said liner second segment define a fluid flow path having inlet and outlet openings; and including a valve seat assembly disposed adjacent to the one of said openings in said section of said second portion and in contact with said liner; and the remainder of said second liner segment adapted to contain valve closure means extending therethrough and having valve plug means adapted to seat in said valve seat assembly.

5. A corrosion resistant valve structure as claimed in claim 4 including means attached to the end of said liner defining the other of said openings for affixing said liner to said body.

6. A corrosion resistant valve structure as claimed in claim 4 wherein said flow path defining section of said second generally tubular liner portion has a radius larger than the radius of the remainder of said second generally tubular liner segment.

7. A corrosion resistant valve structure as claimed in claim 6 wherein said remainder of said second generally tubular segment includes sections of differing radii.

8. A corrosion resistant valve structure as claimed in claim 4 wherein said body defines an enlarged recess adjacent to the end of said liner defining said one opening;

said liner including a flange extending radially out from said end, said flange being seated against a wall of said recess;

said valve seat assembly disposed within said recess against said liner flange; and corrosion resistant gasket means interposed between said liner flange and said valve seat assembly, said gasket means being confined on at least three sides.

9. A corrosion resistant valve structure as claimed in claim 8 including means releasably affixed to said valve body for retaining said valve seat assembly within said recess.

10. A corrosion resistant valve structure as claimed in claim 3 wherein said valve body is split into said body sections along the portion of said passage corresponding to said second generally tubular segment of said liner.

11. A corrosion resistant valve structure as claimed in claim 10 wherein said valve body is split dimetrically along said corresponding segment of said passage.

12. A fluid fixture as claimed in claim 2 wherein said continuous passage and said liner define in part a fluid flow path having at least in an inlet and an outlet, said inlet being disposed at an angle of less than 180° with respect to said outlet.

13. A fluid fixture as claimed in claim 2 wherein said lining is constructed of tantalum, columbium or alloys thereof.

14. A fluid fixture as claimed in claim 13 wherein said lining is constructed of a tantalum-tungsten alloy.

15. A corrosion resistant valve structure as claimed in claim 2 wherein said liner is supported within said body to withstand internal pressures of at least about 300 psig at temperatures of at least about 350°F.

16. A corrosion resistant valve structure as claimed in claim 15 wherein said body includes a plurality of weep holes extending through said body to said passage, whereby leaks internally of the valve structure may be detected.

17. A fluid fixture as claimed in claim 2 wherein said continuous passage and said liner are essentially T-shaped.

18. A fluid fixture as claimed in claim 2 wherein said continuous passage and said liner include segments with at least one segment oriented at an angle of less than 180° relative to at least one other segment.

* * * * *